US 7,883,024 B2

(12) United States Patent
Nakayama et al.

(10) Patent No.: US 7,883,024 B2
(45) Date of Patent: Feb. 8, 2011

(54) HEAT PUMP TYPE WATER HEATER (75) Inventors: Hiroshi Nakayama, Shiga (JP); Shinichi Sakamoto, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 934 days.

(21) Appl. No.: 10/502,618

(22) PCT Filed: Jan. 27, 2003

(86) PCT No.: PCT/JP03/00703

§ 371 (c)(1), (2), (4) Date: Mar. 10, 2005

(87) PCT Pub. No.: WO03/064935

PCT Pub. Date: Aug. 7, 2003

(65) Prior Publication Data

US 2005/0150969 A1  Jul. 14, 2005

(30) Foreign Application Priority Data

Jan. 29, 2002  (JP)  .............................. 2002-019506

(51) Int. Cl.
*F24D 11/02*  (2006.01)

(52) U.S. Cl. ...................... 237/28; 237/19; 62/155; 62/238.6; 62/278

(58) Field of Classification Search ................. 62/238.1, 62/238.2, 238.3, 238.4, 238.5, 197, 238.6, 62/132, 324.6, 155, 151, 278, 277, 296.4, 62/158; 237/2 B, 2 A, 19
See application file for complete search history.

(56) References Cited

U.S. PATENT DOCUMENTS 4,347,711 A     9/1982  Noe et al.
4,553,402 A    11/1985  Cramer, Sr.
4,592,206 A *  6/1986  Yamazaki et al. .............. 62/160
4,646,537 A *  3/1987  Crawford .................... 62/238.6
4,914,926 A *  4/1990  Gregory ..................... 62/196.4
4,949,551 A *  8/1990  Gregory ..................... 62/196.4
5,366,153 A * 11/1994  Swenson ....................... 237/19
5,367,601 A * 11/1994  Hannabery .................. 392/307
5,465,588 A * 11/1995  McCahill et al. .............. 62/127
5,538,072 A *  7/1996  Burkhart et al. ............. 165/232

(Continued)

FOREIGN PATENT DOCUMENTS

| EP | 1 298 395 A2 | 4/2003 |
| JP | 1-17016 Y | 10/1980 |
| JP | 59-12249 A | 1/1984 |
| JP | 61-29649 A | 2/1986 |
| JP | 3-87578 A | 4/1991 |

(Continued)

*Primary Examiner*—Gregory A Wilson
(74) *Attorney, Agent, or Firm*—Birch, Stewart, Kolasch & Birch, LLP.

(57) ABSTRACT

A hot water storage tank (3) and a circulating path (12) coupled to the hot water storage tank (3) are provided. An operation is possible wherein low-temperature water, let out from a lower part of the hot water storage tank (3) and entering the circulating path (12), is heated and boiled up by a heat pump heating source for forwarding to an upper part of the hot water storage tank (3). A refrigerant circulating circuit of the heat pump heating source is provided with a defrost circuit (38) for supplying hot gas from a compressor (25) to an air heat exchanger (28). It is possible to perform a defrost operation for providing a supply of hot gas to the air heat exchanger (28), with a water circulation pump (13) of the circulating path (12) held in abeyance. The water circulation pump (13) is made active if the defrost operation has been continued for not less than a predetermined time period since the start thereof.

13 Claims, 8 Drawing Sheets

U.S. PATENT DOCUMENTS

| | | | |
|---|---|---|---|
| 5,628,199 A * | 5/1997 | Hoglund et al. | 62/155 |
| 5,729,985 A * | 3/1998 | Yoshihara et al. | 62/81 |
| 6,276,153 B1 * | 8/2001 | Skupin et al. | 62/204 |
| 6,418,737 B1 * | 7/2002 | Kuroki et al. | 62/156 |
| 6,837,443 B2 * | 1/2005 | Saitoh et al. | 237/2 B |
| 6,874,694 B2 * | 4/2005 | Saitoh et al. | 237/2 B |
| 6,895,768 B2 * | 5/2005 | Sakamoto et al. | 62/196.4 |
| 7,481,067 B2 * | 1/2009 | Nakayama et al. | 62/222 |
| 2004/0134225 A1 * | 7/2004 | Sakamoto et al. | 62/498 |
| 2005/0167516 A1 * | 8/2005 | Saitoh et al. | 237/2 B |

FOREIGN PATENT DOCUMENTS

| | | |
|---|---|---|
| JP | 4-217754 A | 8/1992 |
| JP | 4-366341 A | 12/1992 |
| JP | 8-152193 A | 6/1996 |
| JP | 10-220932 A | 8/1998 |
| JP | 63-223458 A | 9/1998 |
| JP | 11-63661 A | 3/1999 |
| JP | 2993180 B2 | 10/1999 |
| JP | 11-304309 A | 11/1999 |
| JP | 2001-263800 A | 9/2001 |
| JP | 2001-263812 A | 9/2001 |
| JP | 2002-48399 A | 2/2002 |
| JP | 2002-213821 A | 7/2002 |

* cited by examiner

HEAT PUMP TYPE WATER HEATER

TECHNICAL FIELD

This invention relates to a heat pump type hot water supply apparatus.

BACKGROUND ART

Figure 8:
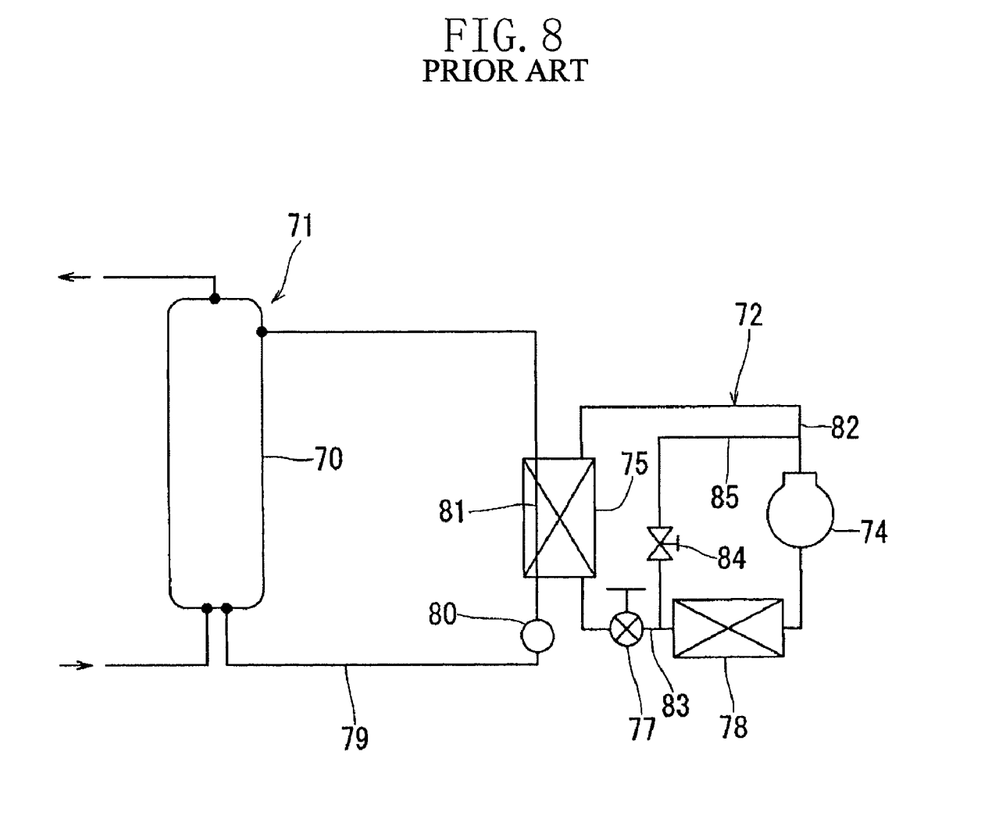
FIG. 8 is a simplified diagram of a conventional heat pump type hot water supply apparatus.

Referring to FIG. 8, there is shown a heat pump type hot water supply apparatus having a refrigerant cycle 72 and a hot water supply cycle 71. The refrigerant cycle 72 includes a compressor 74, a hot water supply heat exchanger (utilization side heat exchanger) 75, an electric expansion valve 77, and a heat source side heat exchanger (air heat exchanger) 78 which are all connected in the given order. On the other hand, the hot water supply cycle 71 includes a hot water storage tank (hot water supply tank) 70 and a circulating path 79. A water circulation pump 80 and a heat exchanging path 81 are inserted in the circulating path 79. In this case, the heat exchanging path 81 is formed by the utilization side heat exchanger (water heat exchanger) 75.

In the above-described heat pump type hot water supply apparatus, when the compressor 74 is activated while the pump 80 is activated (operated), stored water (warm water) flows out through a water intake opening provided in the bottom of the hot water storage tank 70 and enters the circulating path 79. The warm water then flows in the heat exchanging path 81. At that time, the warm water is heated (boiled up) by the water heat exchanger 75. Then, the heated water passes through a hot water inlet opening of the hot water storage tank 70 and is brought back to a top part of the hot water storage tank 70. In this way, high-temperature warm water is stored in the hot water storage tank 70.

The air heat exchanger 78 functions also as an evaporator. Accordingly, in some cases where the outside air temperature is low, frost formation may occur on the air heat exchanger 78, resulting in a drop in capacity. To cope with this, such a type of heat pump type hot water supply apparatus is able to perform a defrost operation for removing the frost. In other words, a defrost operation of supplying hot gas directly to the air heat exchanger 78 from the compressor 74 is carried out. To this end, for example, a discharge pipe 82 of the compressor 74 and a refrigerant flow path 83 establishing connection between the electric expansion valve 77 and the air heat exchanger 78 are connected together by a defrost circuit 85 provided with a defrost valve 84.

By placing the defrost valve 84 in the open state, hot gas from the compressor 74 is allowed to flow into the defrost circuit 85, and the hot gas is then supplied directly to the air heat exchanger 78 through the defrost circuit 85, whereby the frost on the air heat exchanger 78 is melted and removed. And, during the defrost operation, the water circulation pump 80 of the circulating path 79 is stopped.

PROBLEMS TO BE SOLVED

However, if the water circulation pump 80 is stopped during a defrost operation, there is the possibility that water inside the circulating path 79 (water in pipes, the water heat exchanger or the like) freezes. If frozen, this becomes an obstacle to a boiling-up operation, and in the worst case, the circulating path 79 may be damaged. To cope with this, the water circulation pump 80 can be made active, but if activated, this causes low-temperature warm water to flow into the top part of the hot water storage tank 70. Stated another way, since the boiling-up capacity is being considerably low during the defrost operation, it is impossible to boil warm water to an initial temperature (a desired high temperature) during the defrost operation. This lowers the temperature of hot water which is supplied to a bathtub or the like from the hot water storage tank 70. Therefore, the operating time of a subsequent boiling-up operation has to be extended, thereby increasing running-costs.

In addition, if the water circulation pump 80 is activated during a defrost operation, this causes the circulated water to draw heat from refrigerant, thereby increasing the time required for removing the frost, therefore reducing the average capacity (boiling-up capacity) and the reliability of a heat pump type hot water supply apparatus.

The present invention was made to eliminate the above-described drawbacks with the prior art techniques. Accordingly, an object of the present invention is to provide a heat pump type hot water supply apparatus capable of preventing the inside of the circulating path from freezing and in addition capable of reducing the time required for removing the frost and securing reliability.

DISCLOSURE OF INVENTION

A heat pump type hot water supply apparatus of a first invention comprises a hot water storage tank 3, a circulating path 12 coupled to the hot water storage tank 3, and a heat exchanging path 14 inserted in the circulating path 12, wherein: the heat pump type hot water supply apparatus is able to perform an operation in which the heat exchanging path 14 is so heated by a heat pump heating source as to boil low-temperature water let out from a lower part of the hot water storage tank 3 for forwarding to an upper part of the hot water storage tank 3; a refrigerant circulating circuit of the heat pump heating source is formed by a sequential connection of a compressor 25, a water heat exchanger 26 for heating the low-temperature water, a pressure reducing mechanism 27, and an air heat exchanger 28; and the refrigerant circulating circuit further comprises a defrost circuit 38 for supplying hot gas from the compressor 25, to the air heat exchanger 28. And, the heat pump type hot water supplying apparatus of the first invention is characterized in that it is able to perform a defrost operation for providing a supply of hot gas to the air heat exchanger 28, with a water circulation pump 13 of the circulating path 12 held in abeyance, and that a defrost control means 20a is provided which activates the water circulation pump 13 if the defrost operation has been continued for not less than a predetermined time period since the start thereof.

In accordance with the heat pump type hot water supplying apparatus of the first invention, it is possible to perform a defrost operation of supplying hot gas from the compressor 25 to the air heat exchanger 28 when frost formation occurs on the air heat exchanger 28 due to a drop in outside air temperature or the like, whereby the frost growing on the air heat exchanger 28 is melted and removed. And, the water circulation pump 13 is made active if the defrost operation has been continued for a predetermined time period with the water circulation pump 13 held in abeyance. Such arrangement makes it possible to avoid the situation that the water circulation pump 13 is held in abeyance over long periods.

A heat pump type hot water supply apparatus of a second invention is characterized in that activation of the water circulation pump 13 during the defrost operation is carried out when the outside air temperature is not more than a predetermined low temperature.

In accordance with the heat pump type hot water supplying apparatus of the second invention, it is arranged such that activation of the water circulation pump 13 during the defrost operation is carried out when the outside air temperature is not more than a predetermined low temperature. As a result of such arrangement, water in the inside of the circulating path 12 circulates only when the possibility that the inside of the circulating path 12 freezes is high. Since the water circulation pump is not activated when there is no possibility that the inside of the circulating path freezes, this makes it possible to effectively perform a defrost operation and thereby to reduce the time required for performing a defrost operation.

A heat pump type hot water supply apparatus of a third embodiment is characterized in that a bypass flow path 15, branched off from a part of the circulating path 12 on the side of a hot water inlet opening 11 and connected to a lower part side of the hot water storage tank 3, is provided so that warm water, delivered toward the hot water inlet opening 11 during activation of the water circulation pump 13 in the defrost operation, flows into a lower part of the hot water storage tank 3 through the bypass flow path 15.

In accordance with the heat pump type hot water supplying apparatus of the third invention, warm water delivered toward the hot water inlet opening 11 during activation of the water circulation pump in the defrost operation is bypassed to flow into the lower part of the hot water storage tank 3 through the bypass flow path 15, thereby preventing low-temperature warm water from entering the upper part of the hot water storage tank 3. As a result of such arrangement, high-temperature hot water in the upper part of the hot water storage tank 3 is not mixed with low-temperature warm water, thereby preventing hot water to be supplied to a bathtub or the like from the upper part of the hot water storage tank 3 from falling in the temperature.

A heat pump type hot water supply apparatus of a fourth invention is characterized in that a supercritical refrigerant for use in a supercritical state is employed as a refrigerant.

In accordance with the heat pump type hot water supplying apparatus of the fourth invention, there is no trouble with ozone layer depletion and environmental contamination, and the heat pump type hot water supplying apparatus of the fourth invention is a global environment-friendly, heat pump type hot water supplying apparatus.

EFFECTS OF INVENTION

In accordance with the heat pump type hot water supplying apparatus of the first invention, it is possible to perform a defrost operation in which hot gas from the compressor is supplied to the air heat exchanger if there occurs frost formation on the air heat exchanger due to a drop in outside air temperature. The frost on the air heat exchanger is melted and removed, thereby making it possible to perform a stable boiling-up operation without a drop in capacity. And, if the possibility that the inside of the circulating path freezes arises after the defrost operation has been continued for a predetermined time period with the water circulation pump held in abeyance, then the water circulation pump is made active. As a result of such arrangement, the situation that the water circulation pump has been held in abeyance over long periods can be avoided, and the inside of the circulating path is prevented from freezing, and it is possible to achieve a stable boiling-up operation after the defrost operation.

In addition, even when the water circulation pump is activated during the defrost operation, the activation time is very short. Therefore, a large amount of low-temperature warm water will not flow into the upper part of the hot water storage tank. This prevents the hot water in the hot water storage tank from falling in the temperature after completion of the defrost operation, and an extension of the boiling-up operation time after the defrost operation is avoided, thereby making it possible to reduce running costs.

In accordance with the heat pump type hot water supplying apparatus of the second invention, only when the possibility that the inside of the circulating path freezes is extremely high, water circulates in the inside of the circulating path. This avoids unnecessary activation of the water circulation pump, thereby further reducing running costs.

In addition, since the water circulation pump is not activated when there is no possibility that the inside of the circulating path freezes, this makes it possible to effectively perform a defrost operation and thereby to reduce the time required for performing a defrost operation.

In accordance with the heat pump type hot water supplying apparatus of the third invention, even when the water circulation pump is activated during a defrost operation, low-temperature warm water will not flow into the upper part of the hot water storage tank. As a result of such arrangement, high-temperature hot water in the upper part of the hot water storage tank is not mixed with low-temperature warm water, thereby preventing hot water to be supplied to a bathtub or the like from the upper part of the hot water storage tank from falling in the temperature. In other words, it is possible to prevent a drop in the temperature of hot water in the hot water storage tank due to activation of the water circulation pump. Therefore, an extension of the boiling-up operation time due to the drop is avoided, thereby reducing running costs.

In accordance with the heat pump type hot water supplying apparatus of the fourth invention, there is no trouble with ozone layer depletion and environmental contamination, and the heat pump type hot water supplying apparatus of the fourth invention is a global environment-friendly, heat pump type hot water supplying apparatus.

BEST MODE FOR CARRYING OUT INVENTION

A specific embodiment of a heat pump type hot water supply apparatus in accordance with the present invention will be described in detail with reference to the drawings.

Figure 1:
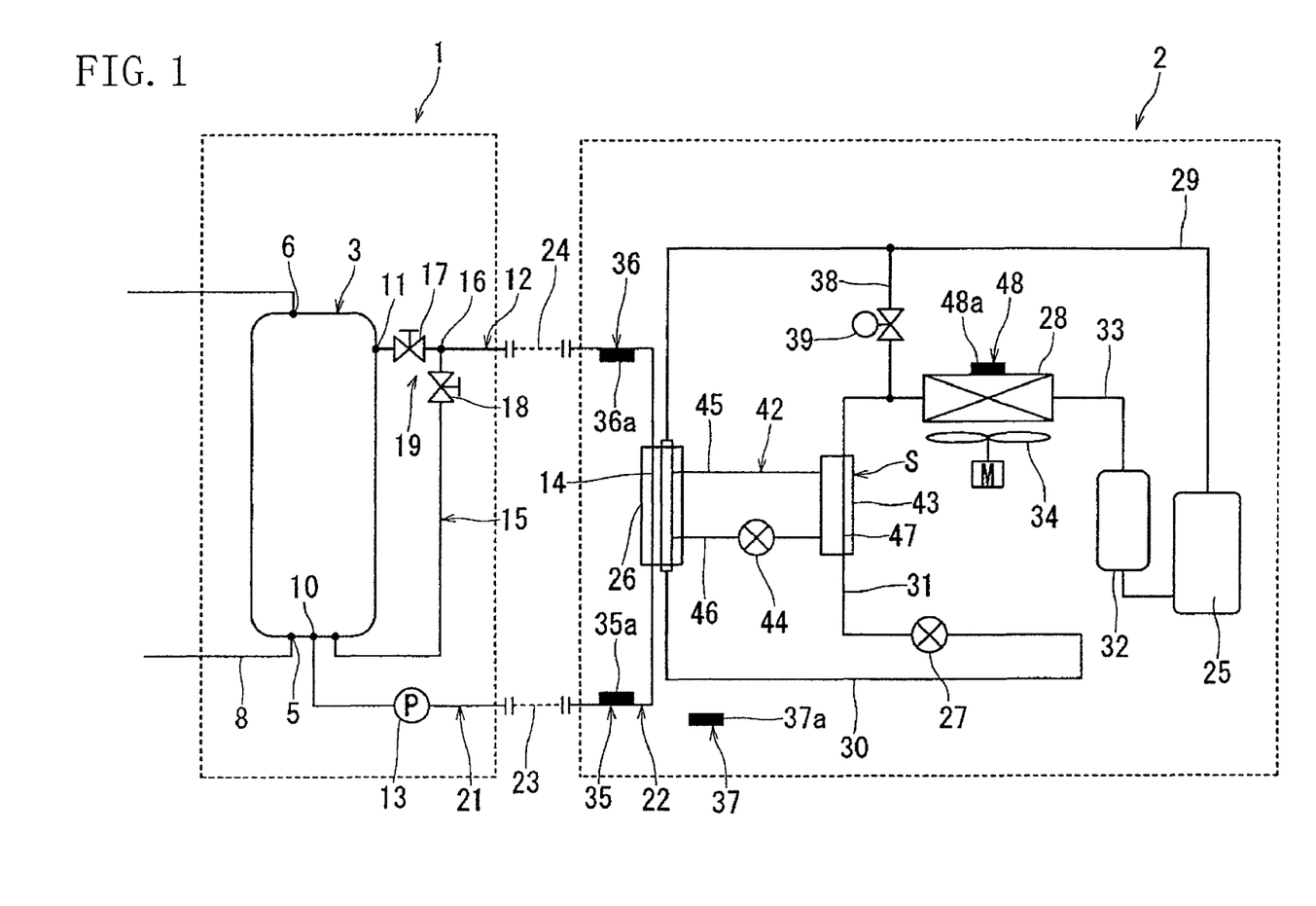
FIG. 1 is a simplified diagram showing an embodiment of a heat pump type hot water supply apparatus according to the present invention.

Referring to FIG. 1, there is shown a simplified diagram of the heat pump type hot water supply apparatus. The heat pump type hot water supply apparatus is comprised of a hot water supply cycle 1 and a refrigerant cycle 2. The hot water supply cycle 1 includes a hot water storage tank 3, wherein hot water stored in the hot water storage tank 3 is supplied to a bathtub (not shown in the figure) or the like. More specifically, the hot water storage tank 3 is provided, at its bottom wall portion, with a water supply opening 5 and is further provided, at its top wall portion, with a hot water supply opening 6. And, tap water is supplied to the hot water storage tank 3 from the water supply opening 5 and high-temperature hot water is delivered outwardly from the hot water supply opening 6.

In addition, in the hot water storage tank 3, a water intake opening 10 is formed in a portion of the bottom wall and a hot water inlet opening 11 is formed in an upper portion of the side wall (peripheral wall), and the water intake opening 10 and the hot water inlet opening 11 are connected together by a circulating path 12. And, a water circulation pump 13 and a heat exchanging path 14 are inserted in the circulating path 12. A water supply flow path 8 is connected to the water supply opening 5.

Furthermore, a bypass flow path 15 is provided in the circulating path 12. In other words, the bypass flow path 15 branches off from a part of the circulating path 12 on the side of the hot water intake opening 11, and is connected to a lower part of the hot water storage tank 3 (a part of the bottom wall in this case). And, inserted between a branch part 16 and the hot water inlet opening 11 is a first switching valve 17. A second switching valve 18 is inserted on the side of the branch part 16 of the bypass flow path 15. The switching valves 17 and 18 constitute a bypass switching means 19. Each of the switching valves 17 and 18 of the bypass switching means 19 is controlled by a control means 20 which will be described later.

When: the first switching valve 17 of the bypass switching means 19 is placed in the open state; the second switching valve 18 is placed in the closed state; and the water circulation pump 13 is activated, warm water is let out from the water intake opening 10 and enters the circulating path 12. Then, the water flows through the heat exchanging path 14. And, the water leaves the heat exchanging path 14 and flows into the upper part of the hot water storage tank 3 from the hot water inlet opening 11. Hereinafter, the state, in which water flows into the upper part of the hot water storage tank 3 through the hot water inlet opening 11, is called the "normal circulation state".

On the other hand, when: the first switching valve 17 of the bypass switching means 19 is placed in the closed state; the second switching valve 18 is placed in the open state; and the water circulation pump 13 is activated, warm water flows outwardly and enters the circulating path 12 from the water intake opening 10. Then, the water flows through the heat exchanging path 14. And, the water leaves the heat exchanging path 14, flows into the bypass flow path 15 through the branch part 16, and flows into the lower part of the hot water storage tank 3 from the bypass flow path 15. Hereinafter, the state, in which water flows into the lower part of the hot water storage tank 3 from the bypass flow path 15, is called the "bypass circulation state". In the bypass circulation state, warm water (low-temperature water) is not allowed to flow into the upper part of the hot water storage tank 3.

Furthermore, the circulating path 12 is provided with a pipe 21 on the side of the hot water supply cycle 1 and a pipe 22 on the side of the refrigerant cycle 2, wherein the pipes 21 and 22 are connected by connection pipes 23 and 24. Since the connection pipes 23 and 24 are laid outdoors, there is the possibility that the inside of the connection pipes 23 and 24 may freeze when the outside air temperature is low, as will be described later.

The refrigerant cycle (heat pump type heating) 2 includes a refrigerant circulating circuit. The refrigerant circulating circuit is formed by a sequential connection of a compressor 25, a water heat exchanger 26 which constitutes the heat exchanging path 14, a pressure reducing mechanism (electric expansion valve) 27, and an air heat exchanger 28. More specifically, a discharge pipe 29 of the compressor 25 is connected to the water heat exchanger 26; the water heat exchanger 26 and the electric expansion valve 27 are connected together by a refrigerant passage way 30; the electric expansion valve 27 and the air heat exchanger 28 are connected together by a refrigerant passage way 31; and the air heat exchanger 28 and the compressor 25 are connected together by a refrigerant passage way 33 in which is inserted an accumulator 32. In addition, a supercritical refrigerant (for example, carbon dioxide gas) for use in a supercritical state is employed as a refrigerant. The air heat exchanger 28 is equipped with a fan 34 for controlling the capacity of the air heat exchanger 28.

And, the circulating path 12 is provided with an incoming water thermistor 35a operable to detect the temperature (incoming water temperature) of warm water (low-temperature water) which is let out from the water intake opening 10 and enters the heat exchanging path 14 and an outgoing hot water thermistor 36a operable to detect the temperature (outgoing hot water temperature) of warm water heated by the heat exchanging path 14. The air heat exchanger 28 is further provided with an air heat exchanger thermistor 48a operable to detect the temperature of the air heat exchanger 28. In addition, the heat pump type hot water supply apparatus of FIG. 1 is provided with an outside air temperature detection thermistor 37a operable to detect the temperature of outside air.

Furthermore, the discharge pipe 29 and the refrigerant passage way 31 (a position in a passage way connecting together the electric expansion valve 27 and the air heat exchanger 28, being located immediately before the air heat exchanger 28), are connected together by a defrost circuit 38 provided with a defrost valve 39. More specifically, hot gas from the compressor 25 is supplied directly to the air heat exchanger 28 which functions as an evaporator, thereby making it possible to perform a defrost operation for removing the frost from on the evaporator 28. The refrigerant cycle 2 is able to perform a normal hot water boiling-up operation and a defrost operation.

Furthermore, a bypass circuit 42 is provided which branches off from the refrigerant circulating circuit on the high-pressure side and which merges into the refrigerant circulating circuit at a position downstream of the branch part. A refrigerant adjusting unit 43 is inserted in the bypass circuit 42. In addition, an adjustment valve 44 for flow rate adjustment is provided on the outlet side of the refrigerant adjusting unit 43. More specifically, the bypass circuit 42 includes a first passage way 45 which branches off from upstream of the water heat exchanger 26 and which is connected to the refrigerant adjusting unit 43, and a second passage way 46 which extends from the refrigerant adjusting unit 43 and which merges with the water heat exchanger 26 on the side downstream of the branch part of the first passage way 45. And, the flow rate adjustment valve 44 is inserted in the second passage way 46.

In the inside of the refrigerant adjusting unit 43, a passage way 47 constituting a part of the refrigerant passage way 31 is arranged, wherein high-pressure refrigerant which has entered the refrigerant adjusting unit 43 through the bypass circuit 42 and low-pressure refrigerant flowing through the passage way 47 are subjected to heat exchange. In this case, the rate of flow of refrigerant passing through the inside of the refrigerant adjusting unit 43 is adjusted by controlling the valve opening of the adjustment valve 44, and the temperature of refrigerant in the refrigerant adjusting unit 43 is controlled, the reason for which is as follows. By the controlling of the valve opening of the flow rate adjustment valve 44, the refrigerant temperature is maintained at a requested value, and the inside of the refrigerant adjusting unit 43 is made to hold an adequate amount of refrigerant, thereby optimizing the amount of refrigerant circulating in the circuit.

Figure 2:
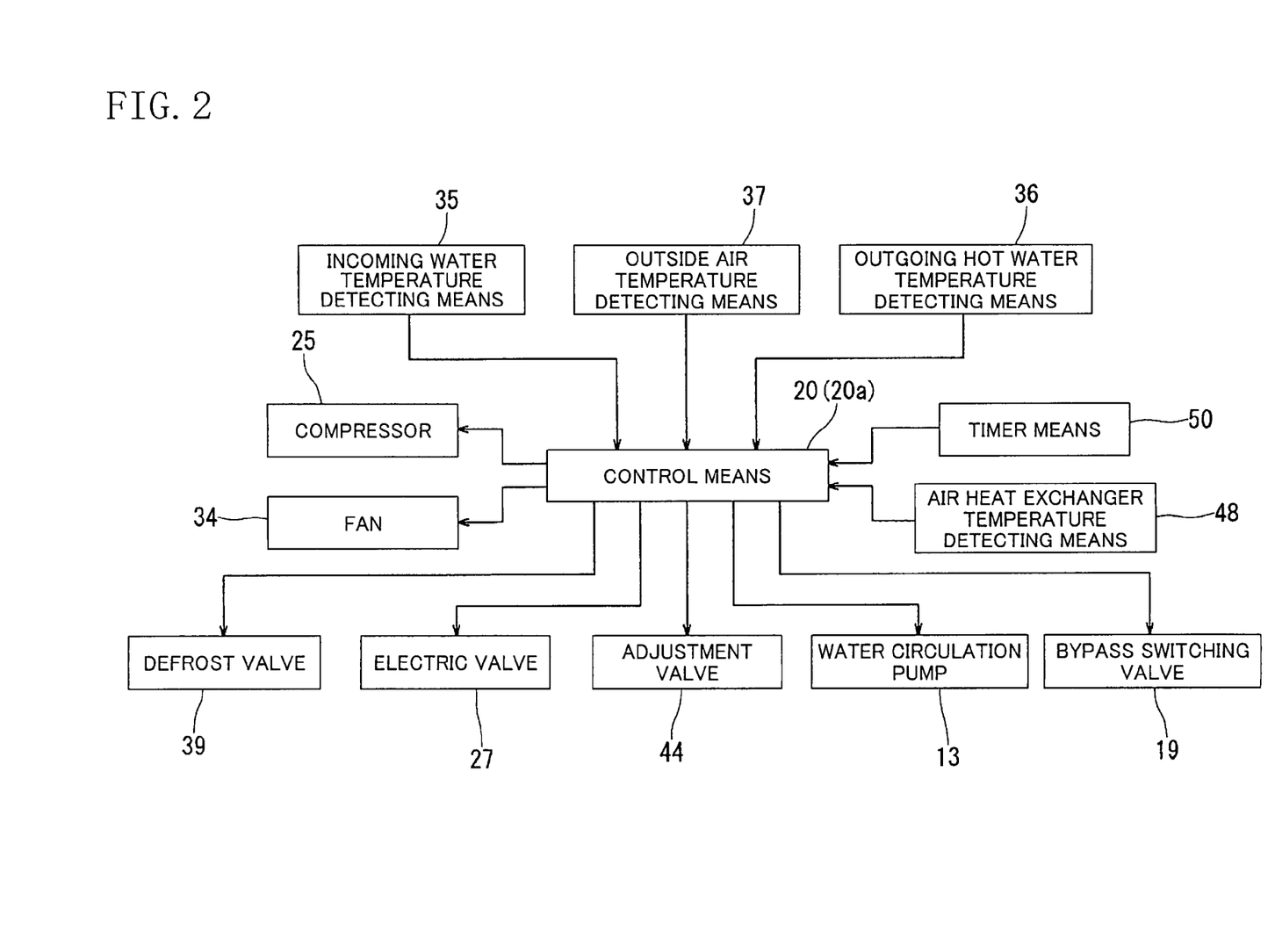
FIG. 2 is a simplified block diagram of a control part of the heat pump type hot water supply apparatus.

The heat pump type hot water supply apparatus has a control part which is provided with an incoming water temperature detecting means 35, an outgoing hot water temperature detecting means 36, an outside air temperature detecting means 37, an air heat exchanger temperature detecting means 48, a timer means 50, a control means 20, and other components (see FIG. 2). Data from these detecting means 35, 36, 37, 48 and data from the timer means 50 are all fed to the control means 20. Based on the data, the control means 20 sends control signals to the compressor 25, to the defrost valve 39, and to other components. In response to the control signals, the compressor 25 and other components are activated.

The incoming water temperature detecting means 35 is formed by the incoming water thermistor 35a. The outgoing hot water temperature detecting means 36 is formed by the outgoing hot water thermistor 36a. The outside air temperature detecting means 37 is formed by the outside air temperature detecting thermistor 37a. The air heat exchanger temperature detecting means 48 is formed by the air heat exchanger thermistor 48a. In addition, the timer means 50 is formed by an existing timer or the like capable of measuring time. The timer means 50 is provided with a timer TD0, a timer TD1, a timer TD2 et cetera. Finally, the control means 20 is formed by for example a microcomputer.

In accordance with the heat pump type hot water supply apparatus as constructed above, when: the bypass switching means 19 is placed in the normal circulation state; the defrost valve 39 is placed in the closed state; the compressor 25 is activated; and the water circulation pump 13 is activated (operated), water (low-temperature water) stored in the hot water storage tank 3 is let out from the water intake opening (10) formed at the bottom part of the hot water storage tank 3 and flows through the heat exchanging path 14 of the circulating path 12. At that time, the low-temperature water is heated (boiled up) by the water heat exchanger 26 and is forced to flow back or flow into the upper part of the hot water storage tank 3 from the hot water inlet opening 11. Such an operation is carried out continuously, thereby making it possible to store high-temperature hot water in the hot water storage tank 3.

Figure 4:
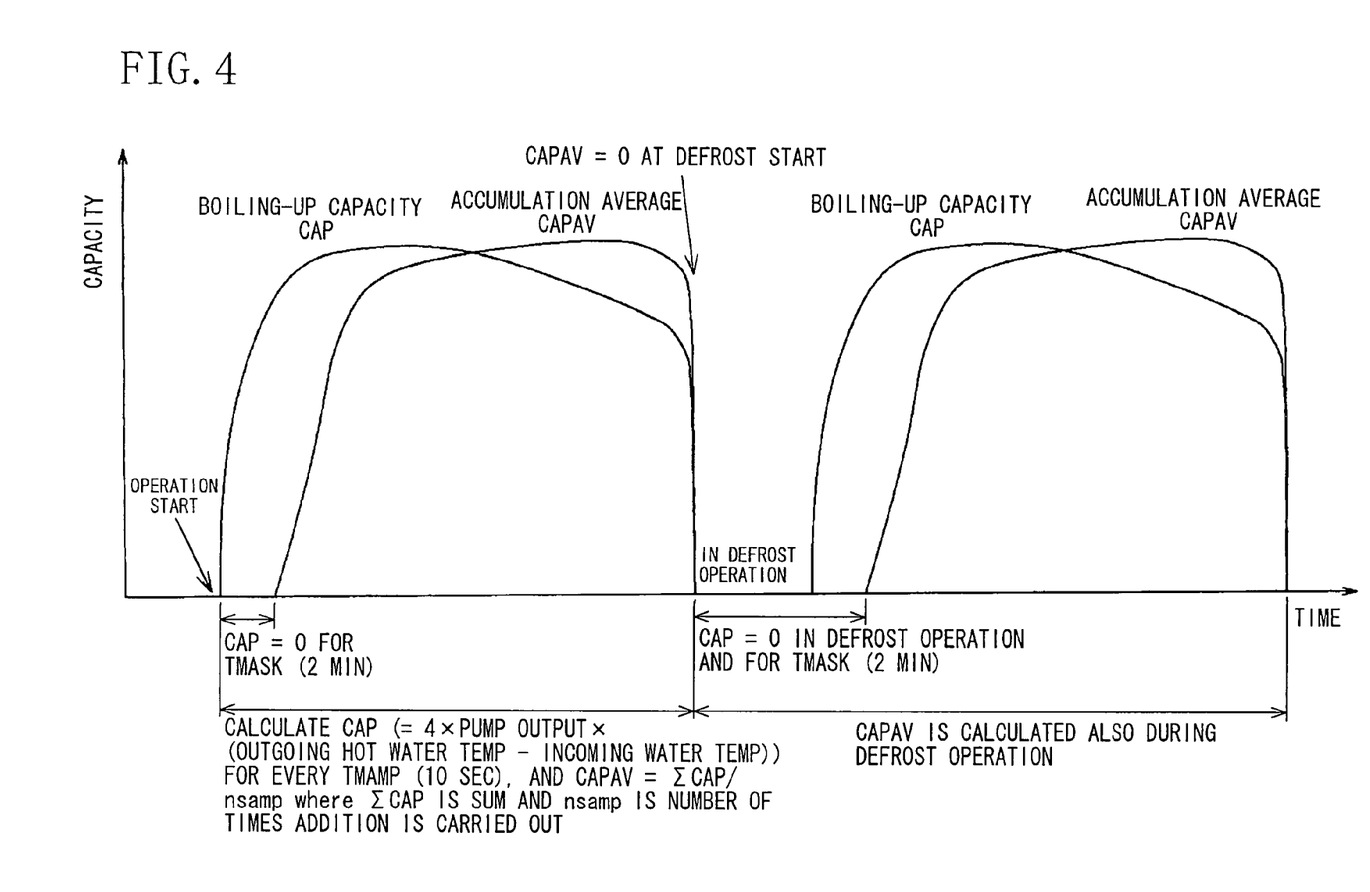
FIG. 4 is a diagram graphically showing the boiling-up capacity of the heat pump type hot water supply apparatus.

And, in the heat pump type hot water supply apparatus, the control means 20 makes it possible to conclude that the air heat exchanger 28 becomes frosted, when the boiling-up capacity falls to a predetermined low capacity or when the average of accumulated values of the boiling-up capacity found at predetermined intervals of time drops a given number of times consecutively. In other words, the boiling-up capacity when there is frost formation on the air heat exchanger 28 is lower than when there is no frost formation, and it is therefore possible to conclude that the air heat exchanger 28 becomes frosted if the boiling-up capacity falls down to a given low boiling-up capacity. This capacity (CAP) is found by the following mathematical expression (1).

$$CAP = KCAP \times PSR \times (DB - DTO) \quad (1),$$

where:
CAP: instantaneous capacity
KCAP: instantaneous capacity calculation coefficient
PSR: pump output
DB: outgoing hot water temperature
DTO: incoming water temperature In this way, the boiling-up capacity is found by: CAP=coefficient×pump output×(outgoing hot water temperature−incoming water temperature). In this case, the incoming water temperature is detected by the incoming water thermistor 35a and the outgoing hot water temperature is detected by the outgoing hot water thermistor 36a. And, the boiling-up capacity draws a wave form as shown in FIG. 4, and when the capacity falls down to a predetermined value, a defrost operation starts. As the capacity index of the water circulation pump 13, pump command value, rotation number et cetera may be used in addition to the pump output and the pump capacity index is one proportional to the amount of water circulating through the water circulation pump 13.

In addition, when finding the average of accumulated values of the boiling-up capacity at predetermined intervals of time, the capacity is calculated at predetermined intervals of time (TSAMP: for example, for every ten seconds), and from a sum of the calculation results, an accumulated value average is obtained by the following mathematical expression (2). Here, CAPAV is the average capacity. ΣCAP is the CAP (boiling-up capacity) accumulated value, and NSAMP is the number of times that accumulation is carried out. And, it can be concluded that the air heat exchanger 28 becomes frosted when the accumulated value average drops a predetermined number of times consecutively (for example, five consecutive times). CAP (boiling-up capacity) is zero until the count time of a timer TMASK (for example, two minutes) elapses since the operation start. In addition, CAPAV is zero at the start of a defrost operation, and the boiling-up capacity (CAP) is zero during the defrost operation and during the counting operation of the timer TMASK. CAPAV is calculated also during the defrost operation.

$$CAPAV = \Sigma CAP / NSAMP \quad (2),$$

where:
CAPAV: average capacity
ΣCAP: CAP accumulated value
NSAMP: number of times accumulation is carried out As described above, when it is concluded that the air heat exchanger 28 becomes frosted, a defrost operation is carried out. The defrost operation is started by supplying hot gas to the air heat exchanger 28 with the water circulation pump 13 held in abeyance. In this case, if the defrost operation is carried out continuously for a long period of time, this produces the danger that the circulating path 12 (especially the inside of the connection pipes 23 and 24 arranged outdoors) freezes. To cope with this, a pipe antifreeze operation, in which the water circulation pump 13 is activated, is carried out. The pipe antifreeze operation is controlled by a defrost control means 20a formed by the control means 20.

Figure 5:
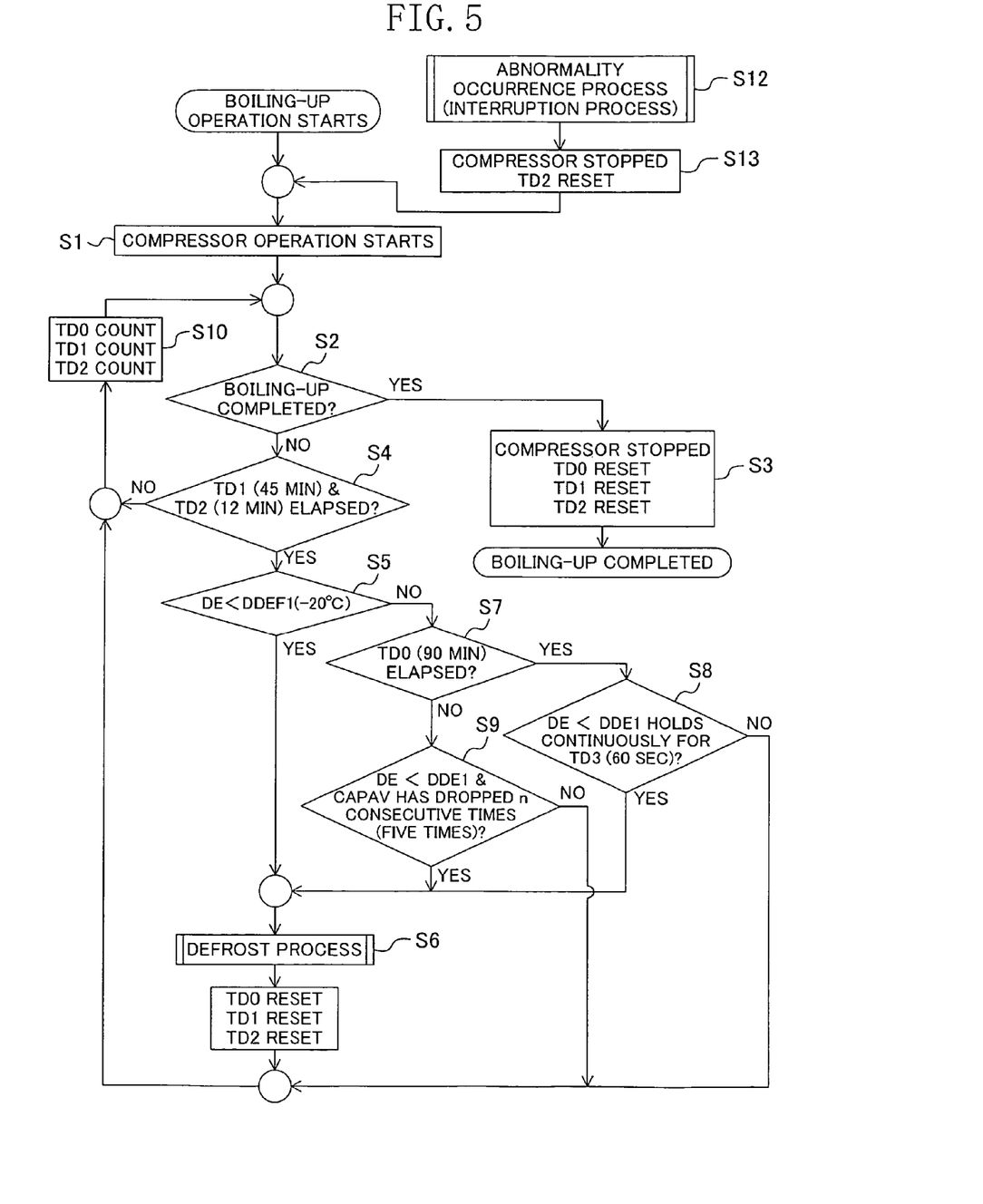
FIG. 5 is a flowchart diagram showing control steps for the start of a defrost operation of the heat pump type hot water supply apparatus.

Referring to the flowchart diagram of FIG. 5, control steps for the start of a defrost operation in the heat pump type hot water supply apparatus will be described. The bypass switching means 19 is placed in a state to start a boiling-up operation (i.e., the normal circulation state) and, in addition, the defrost valve 39 is placed in the closed state, and the compressor 25 starts operating (Step S1). Here, if an abnormality, such as no warm water in the hot water storage tank 3, is detected, this requires execution of a process for dealing with the occurring abnormality (Step S12) so that the compressor 25 is stopped (Step S13) and, thereafter, that the defrost start prevention timer TD2 is reset.

After setting the compressor 25 in operation (Step S1), it is decided whether or not the boiling-up operation has been completed (Step S2). If decided that the boiling-up operation has been completed in Step S2, then the compressor 25 is stopped in Step S3 and each of the TD0, TD1, TD2 timers is reset and the boiling-up operation is terminated (completed).

On the other hand, if in Step S2 it is decided that the boiling-up operation has not been completed yet, then the procedure moves to Step S4. In Step S4 it is decided whether or not the count time of TD1 (for example, 45 minutes) has elapsed and it is also decided whether or not the count time of TD2 (for example, 12 minutes) has elapsed. If decided that they have not yet elapsed, there is made a wait until TD0, TD1, and TD2 have elapsed (Step S10). On the other hand, if decided that they have elapsed, then the procedure moves to Step S5. Here, TD0 is a defrost start decision switching boiling-up operation accumulation timer and its count time is for example 90 minutes. TD1 is a boiling-up operation accumulation timer and its count time is for example 45 minutes.

In Step S5 it is decided whether or not DE<DDEF1 (−20° C.) holds. Here, DE indicates the temperature of the air heat exchanger 28 detected by the air heat exchanger thermistor 48 and DDEF1 indicates the defrost start decision air heat exchanger temperature. DDEF1 is set to for example −20° C. In other words, if the temperature of the air heat exchanger 28 is lower than −20° C., then the procedure moves to Step S6 to perform a frost removing operation (defrost operation).

In addition, if the temperature of the air heat exchanger 28 is not less than −20° C. (Step S5), then the procedure moves to Step S7. In Step S7 it is decided whether or not TD0 (for example, 90 minutes) has elapsed. If decided that TD0 has elapsed, then the procedure moves to Step S8. If not, then the procedure moves to Step S9.

In Step S8 it is decided whether or not DE<DDE1 has held continuously for the count time of the TD3. Here, DDE1 indicates the defrost start decision temperature (reference temperature), e.g., (outside air temperature −9)° C. In other words, a reference temperature lower than the outside air temperature by a predetermined temperature (9° C. in this case) is set, and there is made a comparison between the temperature of the air heat exchanger 28 and the reference temperature; however, −20° C.≦DDE1≦−4° C. In addition, TD3 is a defrost start determination continuation timer and is set to for example a period of 60 seconds.

If the condition is satisfied in Step S8, i.e., if the temperature of the air heat exchanger 28 falls below the reference temperature, then the procedure moves to Step S6. If not, then the procedure moves to Step S2 from Step S10.

Furthermore, in Step S9, the accumulated value average of the boiling-up capacity is found at predetermined intervals of time (for example, 10 seconds) with the condition of DE<DDE1 held, and it is decided whether or not the accumulated average value drops a predetermined number of times consecutively (for example, five consecutive times). If the condition is satisfied, then the procedure moves to Step S6. If not, then the procedure moves to Step S2 from Step S10.

The defrost process of Step S6 is carried out until the cancellation of the defrost operation. And, after Step S6 is completed, each timer (TD0, TD1, TD2) is reset. Thereafter, the procedure move to Step S2 from Step S10 and the boiling-up operation is started again, and in Step S2 it is decided whether or not the boiling-up operation has been completed. Thereafter, the processing procedure is repeatedly carried out.

In the heat pump type hot water supply apparatus, if the temperature (DE) of the air heat exchanger 28 is lower than the defrost start decision air heat exchanger temperature (DDEF1), then a defrost operation is carried out. If not, decision about the presence or absence of frost formation is made based on the temperature (DE) of the air heat exchanger 28 and on the accumulated value average (CAPAV), when the operation continuation time (TDO) is short. On the other hand, when frost formation is liable to take place because the operation continuation time (TDO) is great, decision about the presence or absence of frost formation is made based on the temperature (DE) of the air heat exchanger 28. Such arrangement makes it possible to ensure that, if there is frost formation on the air heat exchanger 28, the frost formation is detected without fail, and it further becomes possible to avoid performing an unnecessary defrost operation when there is no frost formation. In other words, when a defrost operation is being carried out, it is impossible to perform a boiling-up operation, therefore resulting in a drop in hot water supply efficiency. In the heat pump type hot water supply apparatus of the present invention, however, it becomes possible to achieve improvement in capacity and efficiency of the hot water supplying apparatus by avoiding performing a wasteful defrost operation.

And now, if the incoming water temperature used in calculating a boiling-up capacity increases, this decreases the calculated value of the boiling-up capacity. Therefore, if frost formation decision is made based on the boiling-up capacity and the temperature of the air heat exchanger 28, this makes it possible for the decision to be made correctly. In other words, at the time when the incoming water temperature increases, the temperature of the air heat exchanger 28 also increases. Therefore, erroneous detection is unlikely to be made.

In the next place, control of the defrost operation will be described according to the time chart diagram of FIG. 3.

Figure 3:
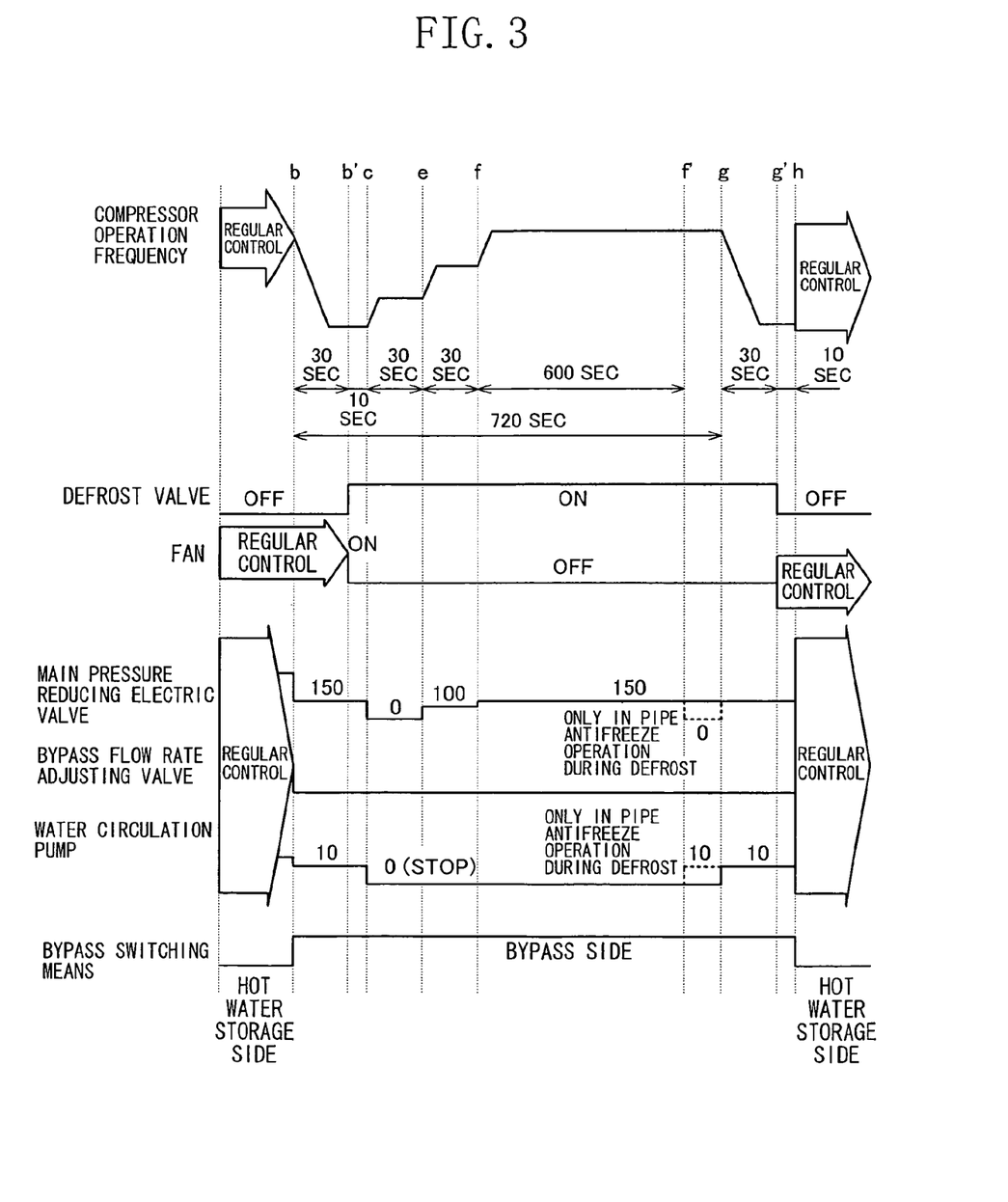
FIG. 3 is a time chart diagram of a defrost operation of the heat pump type hot water supply apparatus.

If it is decided that a defrost operation should be started, then a defrost operation start signal is issued at a point b of FIG. 3. Consequently, the frequency of the compressor 25 is decreased to a predetermined value (for example, 40 Hz) and the valve opening of the electric expansion valve (main pressure reducing electric expansion valve) 27 is reduced to a predetermined valve opening value of for example 150 pulses. In addition, the adjustment valve (bypass flow rate adjusting valve) 44 is placed in the fully closed state and the water circulation pump 13 is decreased in defrost valve switching time pump capacity command value to for example 10 rpm. In addition, the bypass switching means 19 is switched to the bypass circulation state (bypass side).

At a point b' where a predetermined length of time (for example, 30 seconds) has elapsed since the above state, the defrost valve 39 is placed in the open state and the fan 34 is stopped. As a result, hot gas is supplied to the air heat exchanger 28. The reason for lowering the operating frequency of the compressor 25 in the range between the point b and the point b' is: to achieve a reduction in differential pressure in the inside of the refrigerant circulating circuit for ensuring that the defrost valve 39 is switched without fail, to reduce shock noises generated when the defrost valve 39 is switched, and to prevent the compressor 25 from stepping out.

At a point c where a predetermined length of time (for example, 10 seconds) has elapsed since the moment that the defrost valve 39 was placed in the open state, the electric expansion valve 27 is placed in the fully closed state; the water circulation pump 13 is stopped; and the frequency of the compressor 25 is increased up to 58 Hz. At a point e where a predetermined length of time (for example, 30 seconds) has elapsed since then, the electric expansion valve 27 is opened to a predetermined valve opening, e.g., the valve 27 is opened to a small valve opening of for example 100 pulses and the frequency of the compressor 25 is increased up to 76 Hz.

At a point f where a predetermined length of time (for example, 30 seconds) has elapsed since the moment that the electric expansion valve 27 was opened by the small amount of valve opening, the valve opening of the electric expansion valve 27 is opened to a predetermined value of for example 150 pulses and the frequency of the compressor 25 is increased up to 90 Hz. The reason for not stopping the water circulation pump 13 in the range between the point b and the point c is to prevent the water heat exchanger 26 from excessively increasing in temperature.

And, at a point f' where such a condition that the outside air temperature is not more than a predetermined low temperature (for example, 0° C.) continues for a predetermined length of time (for example, 600 seconds) from the point f, the electric expansion valve 27 is placed in the fully closed state and the water circulation pump 13 is activated at a defrost operation period pump capacity command value (for example, 10 rpm) for performing a pipe antifreeze operation. The reason is that the water in the circulating path 12, if it is not circulated in this state, may freeze in the circulating path 12 because the water in the circulating path 12 has not been circulated over a long period of time. Here, the reason for placing the electric expansion valve 27 in the fully closed state is that, if the electric expansion valve 27 is placed in the open state, the circulated water draws heat from the refrigerant and, as a result, the frost formed on the air heat exchanger 28 cannot be melted sufficiently. If the outside air temperature during the defrost operation exceeds the predetermined low temperature or if the defrost operation time does not continue for a predetermined length of time, then the water circulation pump 13 is not activated during the defrost operation. The reason for this is that in such conditions there is no danger that the inside of the circulating path 12 freezes.

From a point g (at which the valve opening of the electric expansion valve 27 is brought back to 150 pulses) where a predetermined length of time (for example, 720 seconds) has elapsed since the point b, the frequency of the compressor 25 starts being lowered. At a point g' where a predetermined length of time (for example, 30 seconds) has elapsed since the point g, the defrost valve 39 is placed in the closed state. At a point h where a predetermined length of time (for example, 10 seconds) has elapsed since then, the operation returns to the normal boiling-up control. The reason for setting the water circulation pump 13 in operation in the range between the point g and the point h prior to the normal control is to correctly detect the temperature of incoming water. In addition, the reason for placing the adjustment valve 44 in the fully closed state during the defrost operation between the point b and the point h is to prevent the occurrence of liquid back when the defrost valve 39 is placed in the open state and to stabilize a refrigeration cycle during the defrost operation. Furthermore, the reason for lowering the frequency of the compressor 25 in the range between the point g and point g' is the same as that for lowering the frequency of the compressor 25 in the range between the point b and the point b'.

In addition, in the aforesaid time chart, the defrost operation is stopped (canceled) at the point g' where the predetermined length of time has elapsed since the point b; however, the defrost operation may be cancelled on the basis of the temperature of the air heat exchanger 28. More specifically, a defrost cancellation decision temperature (DDE2) is set, and the defrost operation is cancelled when DE>DDE2 holds. DDE2 can be found, for example by: DDE2=DOAT+10(° C.). Here, DOAT indicates the outside air temperature. In this case, 4° C.≦DDE2≦12° C.

Figure 6:
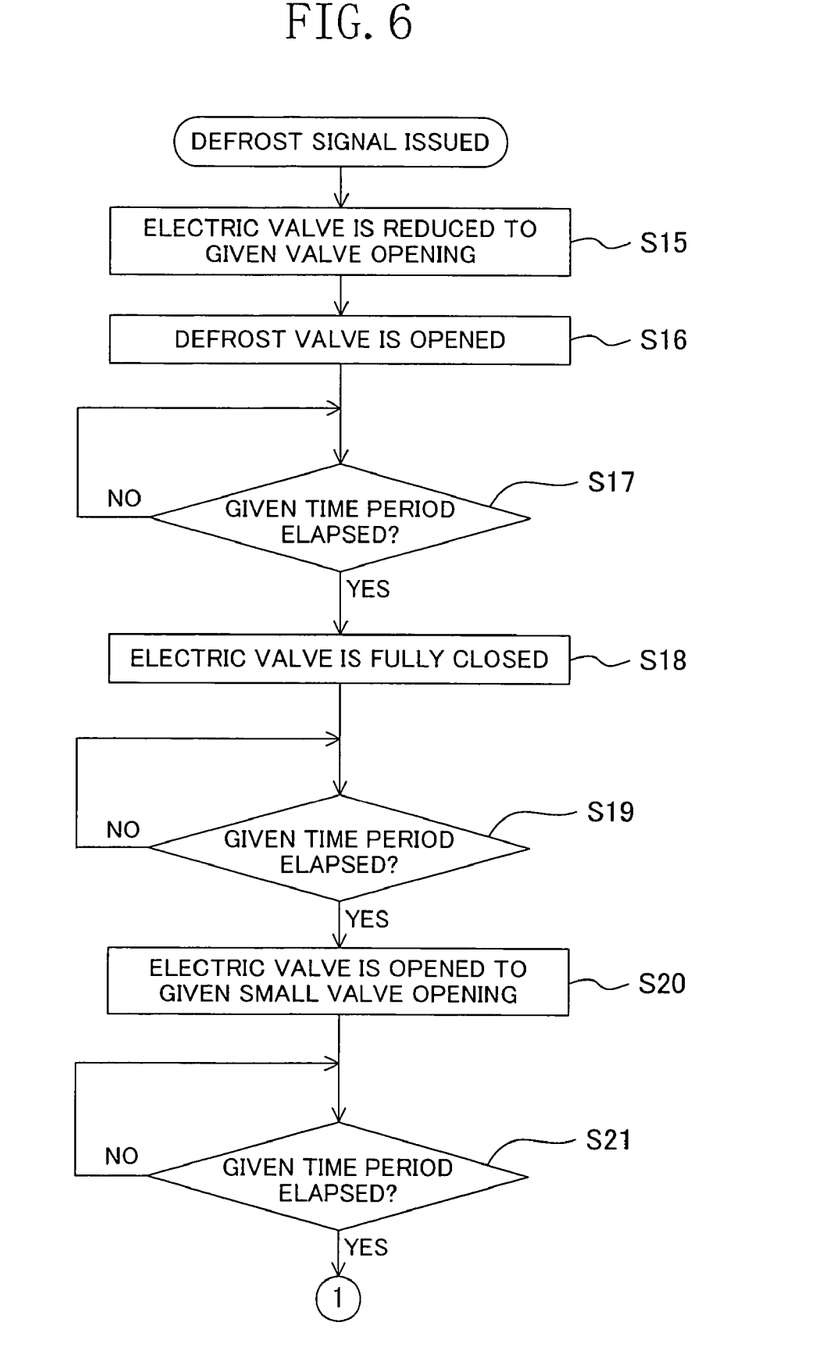
FIG. 6 is a flowchart diagram showing control of the electric expansion valve during the defrost operation of the heat pump type hot water supply apparatus.
Figure 7:
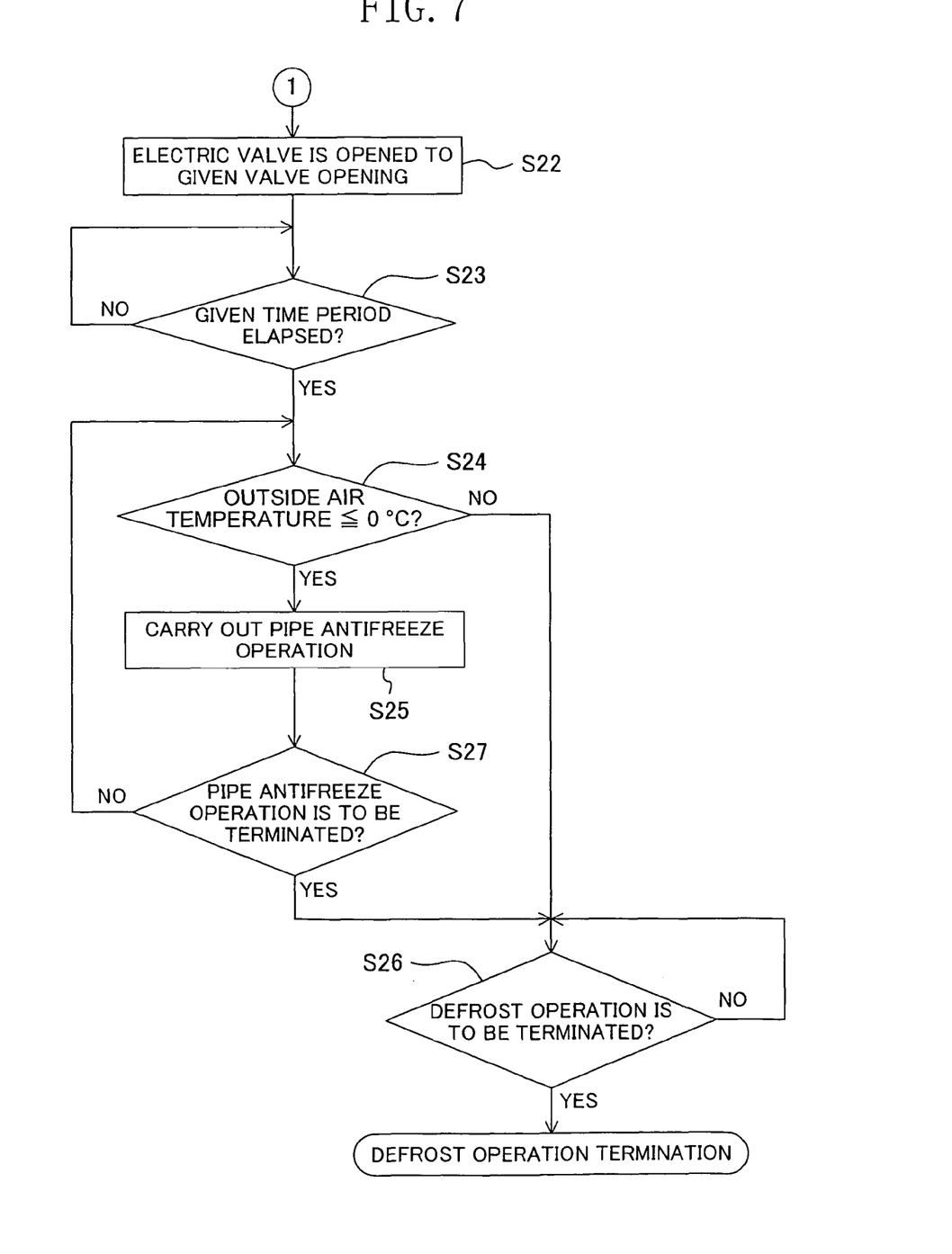
FIG. 7 is a flowchart diagram showing control of the electric expansion valve during the defrost operation of the heat pump type hot water supply apparatus.

In the next place, referring to the flow chart diagrams of FIGS. 6 and 7, the operation (control) of the valve opening of the electric expansion valve 27 when the defrost operation is continued for a predetermined long period of time, will be described further.

If the defrost signal is issued, the procedure moves to Step S15, and the valve opening of the electric expansion valve 27 is reduced to a predetermined value of for example 150 pulses. Thereafter, after elapse of a predetermined length of time (for example, 30 seconds), the procedure moves to Step S16. The defrost valve 39 is placed in the open state so that hot gas starts being supplied to the air heat exchanger 28. Then, the procedure moves to Step S17 and it is decided whether or not a predetermined length of time (for example, 40 seconds) has elapsed since the valve opening of the electric expansion valve 27 was reduced to the aforesaid value. And, there is made a wait until the predetermined length of time will have elapsed. When elapsed, then the procedure moves to Step S18 and the electric expansion valve 27 is placed in the fully closed state.

Thereafter, the procedure moves to Step S19 and it is decided whether or not a predetermined length of time (for example, 30 seconds) has elapsed since the electric expansion valve 27 was placed in the fully closed state. And, there is made a wait until the predetermined length of time will have elapsed. When elapsed, the procedure moves to Step S20 and the valve opening of the electric expansion valve 27 is opened to a predetermined small value of for example 100 pulses. Thereafter, the procedure moves to Step S21 and it is decided whether or not a predetermined length of time (for example, 30 seconds) has elapsed since the valve opening of the electric expansion valve 27 was opened to the predetermined small value.

There is made a wait until the predetermined length of time will have elapsed. When elapsed, the procedure moves to Step S22 and the valve opening of the electric expansion valve 27 is brought back to a predetermined value of for example 150 pulses. It is decided whether or not a predetermine length of time (for example, 600 seconds) has elapsed since the valve opening of the electric expansion valve 27 was set to the predetermined value. And, there is made a wait until the predetermined length of time will have elapsed. When elapsed, the procedure moves to Step S24, and it is decided whether or not the outside air temperature is not more than 0° C. If the outside air temperature ≦0° C., then the procedure moves to Step S25. On the other hand, if the outside air temperature is in excess of 0° C., then the procedure moves to Step S26.

In Step S25, a pipe antifreeze operation is carried out. In other words, the water circulation pump 13 is activated at a predetermined pump command value (for example, 10 rpm) and the warm water in the circulating path 12 is circulated. At this time, the electric expansion valve 27 is placed in the fully closed state. In addition, after execution of the pipe antifreeze operation, the procedure moves to Step S27 and it is decided whether or not the pipe antifreeze operation has been completed. In Step S27, it is decided whether or not a predetermined length of time (for example, 720 seconds) has elapsed since the issue of the defrost operation signal. If elapsed, then the procedure moves to Step S26. If not elapsed, then the procedure moves back to Step S24. The pipe antifreeze operation is terminated if the outside air temperature exceeds 0° C.

If it is decided that the pipe antifreeze operation has been terminated, then the valve opening of the electric expansion valve 27 is brought back to the aforesaid predetermined value (150 pulses) while the water circulation pump 13 remains in operation. And, in Step S26, it is decided whether or not the defrost operation is to be terminated. If it is decided that the defrost operation is to be terminated, then the defrost operation is terminated. Decision whether or not the defrost operation is to be terminated is made based on the time elapsed since the issue of the defrost operation signal or based on the temperature of the air heat exchanger 28.

As described above, in the heat pump type hot water supply apparatus, the occurrence of liquid back after the defrost valve 39 is placed in the open state is prevented by controlling the valve opening of the electric expansion valve 27 during the defrost operation (between the point c and the point f of FIG. 3). In addition, by opening the electric expansion valve 27 thereafter, refrigerant accumulation in the water heat exchanger 26 during the defrost operation is prevented. This therefore improves the reliability of the heat pump type hot water supply apparatus, thereby making it possible to perform a stable boiling-up operation.

In addition, when there is frost formation on the air heat exchanger 28, the frost on the air heat exchanger 28 is melted by a supply of hog gas from the compressor 25 to the air heat exchanger 28. Besides, for example, if the defrost operation is continued over a long period of time when the outside air temperature is low (for example, $\leq 0°$ C.), the water circulation pump 13 is activated, thereby preventing the inside of the circulating path 12 from freezing.

Furthermore, even when the water circulation pump 13 is activated during the defrost operation, the warm water in the circulating path 12 flows through the bypass circuit 15 but does not flow into the upper part of the hot water storage tank 3. In other words, high-temperature hot water in the upper part of the hot water storage tank 3 will not be mixed with low-temperature warm water. Therefore, the drop in temperature of hot water that is supplied from the hot water storage tank 3 to a bathtub et cetera is prevented. As a result of such arrangement, it is possible to prevent the temperature of hot water held in the hot water storage tank 3 from falling due to the execution of a defrost operation, thereby making it possible to avoid the extension of a subsequent boiling-up operation and to reduce running costs.

In the above, the specific embodiments of the present invention have been described, but they should not in any way be deemed restrictive. It is to be understood that changes and variations may be made without departing from the scope of the present invention. For example, the aforesaid predetermined time which serves as a reference for activating the water circulation pump 13 during the defrost operation may be modified within a non-freezing range according to the outside air temperature or according to the pipe material, thickness, or linear dimension of the circulating path 12. In addition, the aforesaid predetermined low temperature (i.e., the predetermined low temperature in the second invention) may be modified according to the predetermined time or according to the pipe material of the circulating path 12 or the like.

Preferably carbon dioxide gas is used as a refrigerant for use in the refrigerant circulating circuit. Other than carbon dioxide gas, dichlorodifluoromethane (R-12) or chlorodifluoromethane (R-22) may be used. Substitute refrigerants, such as 1,1,1,2-tetrafluoroethane (R-134a), may be used in view of the problems such as ozone layer depletion and environmental contamination.

INDUSTRIAL APPLICABILITY

As has been described above, the present invention is useful for a heat pump type hot water supply apparatus having a hot water supplying cycle and a refrigerant cycle and the heat pump type hot water supply apparatus of the present invention is suitable particularly when performing a defrost operation.

What is claimed is:

1. A heat pump type hot water supply apparatus, comprising:
    a hot water storage tank;
    a circulating path coupled to said hot water storage tank;
    a heat exchanging path inserted in said circulating path;
    said heat pump type hot water supply apparatus being operable to perform an operation in which said heat exchanging path is so heated by a heat pump heating source as to boil low-temperature water let out from a lower part of said hot water storage tank for forwarding to an upper part of said hot water storage tank;
    a refrigerant circulating circuit of said heat pump heating source being formed by a sequential connection of a compressor, a water heat exchanger for heating said low-temperature water, a pressure reducing mechanism, and an air heat exchanger;
    said refrigerant circulating circuit further comprising a defrost circuit for supplying hot gas from said compressor, to said air heat exchanger;
    wherein said heat pump type hot water supply apparatus is operable to perform a defrost operation for providing a supply of hot gas to said air heat exchanger, with a water circulation pump of said circulating path held in abeyance;
    wherein defrost control means is provided which activates said water circulation pump if said defrost operation has been continued for not less than a predetermined time period since the start thereof.

2. The heat pump type hot water supply apparatus of claim 1, wherein activation of said water circulation pump during said defrost operation is carried out when the outside air temperature is not more than a predetermined low temperature.

3. The heat pump type hot water supply apparatus of either claim 1 or claim 2, wherein a bypass flow path, branched off from a part of said circulating path on the a side of a hot water inlet opening and connected to a lower part side of said hot water storage tank, is provided so that warm water, delivered toward said hot water inlet opening during activation of said water circulation pump in said defrost operation, flows into a lower part of said hot water storage tank through said bypass flow path.

4. The heat pump type hot water supply apparatus of claim 1, wherein a supercritical refrigerant is employed as a refrigerant.

5. A water heating apparatus, comprising:
    a heat exchanger which heats water supplied by a water circulating path;
    a refrigerant circulating circuit coupled to the heat exchanger and further comprising a compressor and an air heat exchanger;
    a defrost circuit coupled to the refrigerant circulating circuit, wherein during a defrost operation, hot gas is provided by the compressor to the air heat exchanger, and further wherein the flow of water through the water circulating path is varied, based upon commands from a controller, when the controller determines the defrost operation exceeds a predetermined period of time; and
    a water circulating pump coupled to the water circulating path, wherein during the defrost operation, the controller halts the operation of the water circulating pump.

6. The water heating apparatus according to claim 5, further comprising:
    a water circulating pump coupled to the water circulating path; and
    a hot water storage tank coupled to the water circulating pump within the water circulating path, wherein water is supplied from a lower part of the hot water storage tank to the heat exchanger, and heated water returns to an upper part of the hot water storage tank through the water circulating path.

7. The water heating apparatus according to claim 6, further comprising:
a bypass flow path, having one end branching from the water circulating path proximate to the upper part of the hot water storage tank, and having another end connected to the lower part of the hot water storage tank, wherein during the defrost operation, water flows into the lower part of the hot water storage tank through said bypass flow path from the heat exchanger.

8. The water heating apparatus according to claim 5, wherein during the defrost operation, the controller reactivates the operation of the water circulating pump if the defrost operation exceeds a predetermined time.

9. The water heating apparatus according to claim 5, further comprising:
a first temperature sensor coupled to an input of the heat exchanger;
a second temperature sensor coupled to the output of the heat exchanger; and
a third temperature sensor coupled to the air heat exchanger,
wherein the controller initiates the defrost operation based upon inputs from the first, second, and third temperature sensors.

10. The water heating apparatus according to claim 5, further comprising:
a temperature sensor which measures the outside air temperature, and further wherein during the defrost operation, the controller activates the water circulation pump based upon an input from the temperature sensor being below a predetermined temperature.

11. A method for controlling a water heating apparatus, comprising:
initiating compressor operation; and
determining whether a boiling-up operation has been completed, and, if completed,
determining whether a period of time has elapsed, and, if elapsed,
determining whether a temperature of an air heat exchanger is less that a predetermined threshold, and if less,
performing a defrost process.

12. The method according to claim 11, wherein, if the temperature of the air heat exchanger is not less that a predetermined threshold, the method further comprises:
determining whether a second period of time has elapsed, and, if elapsed,
determining whether the temperature of the air heat exchanger is less that the predetermined threshold measured over a third predetermined period of heat exchanger has dropped consecutive number of a predetermined number of time, if so,
performing a defrost process.

13. The method according to claim 11, wherein, if the temperature of the air heat exchanger is not less that a predetermined threshold, the method further comprises:
determining whether a second period of time has elapsed, and, if elapsed,
determining whether the temperature of the air heat exchanger is less that the predetermined threshold and whether an average boiling up capacity of a heat exchanger has dropped consecutive number of a predetermined number of times, if so,
performing a defrost process.

* * * * *